United States Patent [19]
Hanneken

[11] Patent Number: 6,139,189
[45] Date of Patent: Oct. 31, 2000

[54] MULTIPLE POLE, SHADED POLE SUBFRACTIONAL-HORSEPOWER INDUCTION MOTOR

[75] Inventor: John B. Hanneken, Tempe, Ariz.

[73] Assignee: Dial Manufacturing, Inc., Phoenix, Ariz.

[21] Appl. No.: 09/021,432

[22] Filed: Feb. 10, 1998

[51] Int. Cl.[7] ................................................ F16C 23/04
[52] U.S. Cl. ................................................ 384/208
[58] Field of Search .................................. 384/206, 208, 384/209, 213, 214

[56] References Cited

U.S. PATENT DOCUMENTS

4,243,192  1/1981  Johnson .
5,435,652  7/1995  Howard ................................. 384/209

Primary Examiner—Lenard A. Footland
Attorney, Agent, or Firm—Tod R. Nissle, P.C.

[57] ABSTRACT

A bearing sleeve and method for manufacturing the same enable a bearing to be placed in a captive position in the sleeve by inserting the bearing into a slot in the sleeve and then slidably rotating the bearing to the captive position.

3 Claims, 11 Drawing Sheets

MULTIPLE POLE, SHADED POLE SUBFRACTIONAL-HORSEPOWER INDUCTION MOTOR

This invention pertains to motors.

More particularly, the invention pertains to concentric, multiple pole, shaded pole, subfractional-horsepower induction motors.

In another respect, this invention relates to a sleeve for a bearing and to a method of making the sleeve.

In a further more particular respect, the invention relates to a sleeve for a cylindrical bearing which permits the bearing to be loaded into the sleeve and turned to a position in which the bearing is retained in the sleeve.

In still another respect, the invention relates to a method of manufacture of a sleeve for an arcuate bearing when the bearing has an outer diameter less than about one inch and a height less than the outer diameter of the bearing.

Subfractional-horsepower induction motors have a horse-power (HP) of 1/20 HP or less, typically 1/150 HP to 1/20 HP. Such motors ordinarily include a single piece stator, an armature rotationally mounted in an opening in the stator, two or more primary poles, and two or more "shaded" or secondary poles. A shaded pole or coil is a piece of material than can conduct electricity to create another magnetic field inside the primary magnetic field generated in the motor. The primary magnetic field is generated by wire wrapped around a primary pole. The secondary pole or magnetic field gives the motor its initial direction and rotation when it starts. The secondary pole makes the motor spin by changing the characteristics of the magnetic field in the stator. Subfractional-horsepower motors are used to power water pumps in evaporative coolers and are used in other applications which require a small motor. The design and efficiency of subfractional horsepower induction motors have in large part remained unchanged for many years.

Arcuately shaped bearings and sleeves which house such bearings are known in the art.

One prior art bearing and its associated sleeve or housing are disclosed in the article "Composite Spherical Bearing Is Self-Aligning" which appears at page 102 of the Apr. 4, 1993 Design News magazine. The bearing is spherically shaped, includes a pair of ends or flats and includes an outer spherical convex surface which extends between the ends. A cylindrical aperture is formed through the bearing. The cylindrical aperture includes a centerline. The outer spherical surface of the bearing symmetrically circumscribes the cylindrical aperture and also symmetrically circumscribes and is spaced apart from the centerline of the cylindrical aperture. In sum, the appearance of the spherically shaped bearing is akin to that of a bead on a necklace, where the bead is not completely spherical but has been truncated to form two parallel, spaced apart opposed ends or flats. The spherically shaped bearing is positioned in its associated sleeve by (1) inserting the bearing through a slot formed in the race in an orientation in which the flats or ends of the bearing are parallel to the sides of the slot, and (2) rotating the bearing inside the sleeve to a position in which sleeve securely retains the bearing during use. The sleeve includes an inner spherical or concave surface which conforms to and mates with the outer spherical surface of the bearing such that the bearing can rotate and turn in the sleeve. In many cases, the inner concave surface of the sleeve can be produced utilizing an expanding mandrel. When, however, the diameter of the bearing, and consequently of the opening in the sleeve, becomes less than about one inch, utilizing an expanding mandrel machine tool becomes impractical because the mandrel, due to the thinness of the fingers comprising the mandrel, will not last for many cycles and typically may only last a few hundred cycles before failing and requiring the providing of a brand new expanding mandrel.

Accordingly, it would be highly desirable to provide an improved subfractional-horsepower induction motor and method for producing the same.

It would also be highly desirable to provide an improved sleeve with an inner concave surface shaped to house a small bearing with an outer convex surface and to provide a practical, economical manufacturing method and apparatus for producing such a sleeve so that thousands or millions of sleeves can be reliably manufactured with a single set of manufacturing apparatus.

Therefore, it is a principal object of the invention to provide an improved subfractional-horsepower induction motor and method for producing the same.

A further object of the invention is to provide an improved subfractional-horsepower induction motor which permits the mounting of wound wire on the stator before the final assembly of the stator.

Another object of the invention is to provide an improved concentric subfractional-horsepower induction motor which utilizes an armature or rotor which can be interchangeably utilized on a C-frame stator in a subfractional-horsepower induction motor.

Still a further object of the invention is to provide an improved concentric subfractional-horsepower induction motor which utilizes reluctance gaps to force the primary magnetic field into the rotor or armature of the motor to increase the strength of the motor.

Yet another object of the invention is to provide an improved mounting bracket for a subfractional-horsepower induction motor.

Yet still another object of the invention to provide an improved sleeve for a bearing having a concave outer surface.

A further object of the invention is to provide an improved method and apparatus for producing a sleeve for a bearing.

Another object of the invention is to provide an improved method and apparatus for producing a sleeve for a small bearing having a diameter of about one inch or less.

These and other, further and more specific objects and advantages of the invention will be apparent to those skilled in the art from the following detailed description thereof, taken in conjunction with the drawings, in which:

Briefly, in accordance with my invention, I provide an improved sleeve for an arcuate bearing. The sleeve permits the bearing to be loaded into the sleeve and turned to a position in which the bearing is retained in the sleeve. The bearing has a height and an outer diameter greater than said height. The sleeve includes a top; a bottom opposed to and spaced apart from the top; an elongate opening formed in the top to receive the bearing, having ends (207, 208) and sides (215, 216), and having a length and a width less than the length, the width being greater than the height of the bearing but less than the outer diameter of the bearing; an opening formed in the bottom and including a first pair of spaced apart opposing edges, and a second pair of spaced apart opposing edges bounding and spaced further apart than the first pair of opposing edges; a first pair of opposing spaced apart side walls (202, 203); and, a second pair of opposing spaced apart side walls (205, 225). Each of the first pair of opposing side walls (202, 203) can have an arcuate shape. Each of the second pair of opposing side walls (205, 225) can have an arcuate shape.

In another embodiment of my invention, I provide an improved method for molding a sleeve for an arcuate bearing which permits the bearing to be loaded into the sleeve and turned to a position in which the bearing is retained in the sleeve. The bearing has a height and an outer diameter greater than said height. The sleeve includes a top; a bottom opposed to and spaced apart from the top; an elongate opening formed in the top to receive the bearing, having ends (207, 208) and sides (215, 216), and having a length and a width less than the length, the width being greater than the height of the bearing but less than the outer diameter of the bearing; an opening formed in the bottom and including a first pair of spaced apart opposing edges, and a second pair of spaced apart opposing edges bounding and spaced further apart than the first pair of opposing edges; a first pair of opposing spaced apart side walls (202, 203); and, a second pair of opposing spaced apart side walls (205, 225). Each of the first pair of opposing side walls (202, 203) can have an arcuate shape. Each of the second pair of opposing side walls (205, 225) can have an arcuate shape. The improved method includes the steps of providing a mold having a top and a bottom and a mold opening extending through the top and bottom; providing a first mold insert insertible through the bottom into the mold opening to form the first pair of opposed spaced apart side walls when molding material is inserted in the mold to form the sleeve; and, providing a second mold insert insertible through the top into the opening adjacent the first mold insert to form the second pair of opposing side walls when molding material is inserted in the mold to form the sleeve. The second mold insert including arms withdrawn through the opening in the bottom of the sleeve formed when molding material is inserted in the mold.

Figure 1:
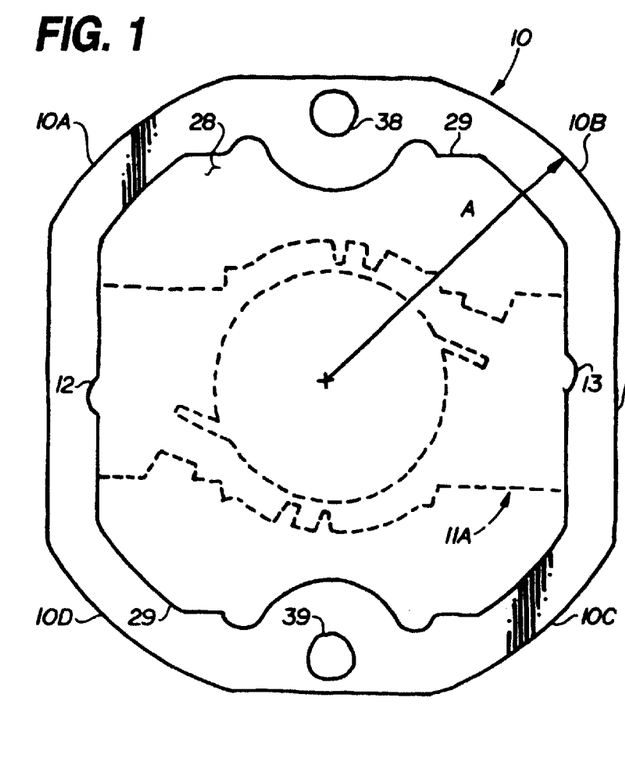
FIG. 1 is a top view illustrating a metal lamina utilized to form the outer portion of the stator of the motor of the invention.
Figure 2:
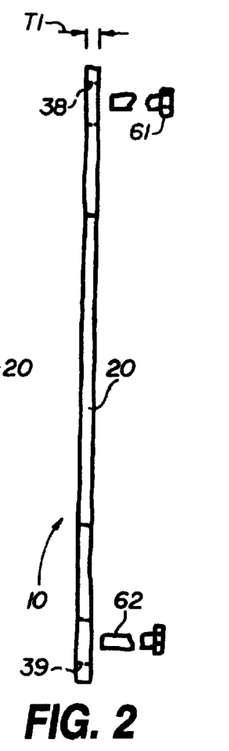
FIG. 2 is a side view further illustrating the lamina of FIG. 1.

Turning now to the drawings, which depict the presently preferred embodiments of the invention for the purpose of illustrating the practice thereof and not by way of limitation of the scope of the invention, and in which like reference characters identify corresponding elements throughout the several views, FIG. 1 illustrates a steel lamina or plate 10 utilized in the construction of the outer portion of the stator of the motor of the invention. The inner peripheral edge 29 of the lamina 10 circumscribes and bounds an open inner area 28. Cylindrical apertures 38 and 39 are formed through lamina 10. Detents 12 and 13 are formed on the inside of lamina 10. The side view of lamina 10 in FIG. 2 shows the right hand edge 20 of the lamina. The width or diameter of lamina 10 equals twice the distance indicated by arrow A. Arcuate portions 10A, 10B, 10C, and 10D lie on the circumference of a circle having a radius indicated by arrow A. In the presently preferred concentric subfractional-horsepower inductance motor constructed in accordance with the invention, the distance indicated by arrow A is 1.65 inches. The outer portion or outer laminate stack of the stator is formed by stacking a plurality of laminae 10 in conventional fashion in registration one on top of the other such that apertures 38 in each lamina are aligned with apertures 38 in the other stacked laminae and such that apertures 39 in each lamina are aligned with apertures 39 in the other stacked laminae.

Figure 3:
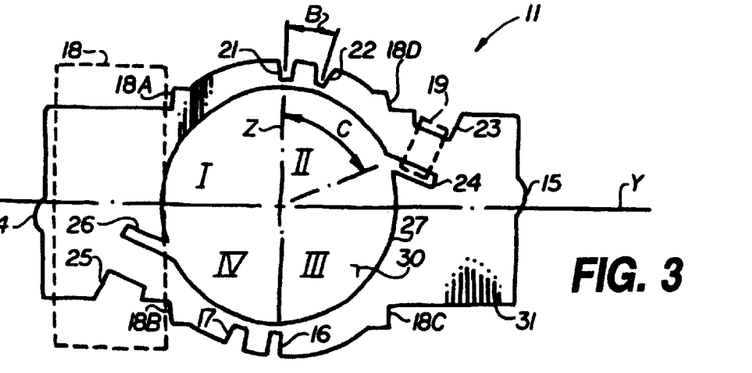
FIG. 3 is a top view illustrating a metal lamina utilized to form the inner portion of the stator of the motor of the invention.

FIG. 3 illustrates a steel lamina or plate 11 utilized in the construction of the inner portion of the stator of the motor of the invention. Lamina 11 includes slots pairs 25,26 and 23,24 and includes reluctance gap pairs 21,22 and 16,17. The distance between gaps 21 and 22 (or gaps 16 and 17) along an arc is presently 21 degrees, preferably about 20 to 22 degrees. However, the distance between gaps 21 and 22 (or gaps 16 and 17) indicated by arrows B can be in the range of 10 to 40 degrees depending on the desired construction of the concentric subfractional-horsepower shaded pole inductance motor of the invention. Lamina 11 includes longitudinal axis Y and cylindrical aperture 27 formed therethrough. The inner cylindrical surface of aperture 27 circumscribes and bounds open area 30. Normal axes Y and Z cut circular area 30 into four pie shaped quadrants I, II, III, IV. Reluctance gaps 21,22 and slots 23,24 lie in quadrant II, i.e., both gaps 21,22 are within ninety degrees of slots 23, 24. Consequently, the length of the arc indicated by arrows C is less than ninety degrees. Reluctance gaps 16,17 and slots 25,26 lie in quadrant IV, i.e., both gaps 21, 22 are within ninety degrees of arc of slots 25, 26. Flat planar edges 18A, 18B, 18C, 18D are each of equivalent shape and dimension. Nubs 14 and 15 are formed at opposite ends of lamina 11.

Figure 4:
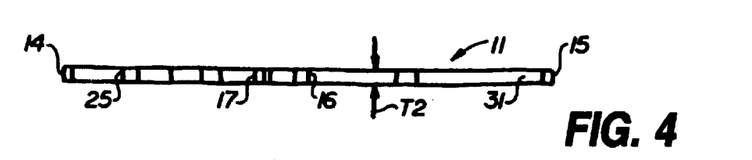
FIG. 4 is a side view further illustrating the lamina of FIG. 3.
Figure 5:
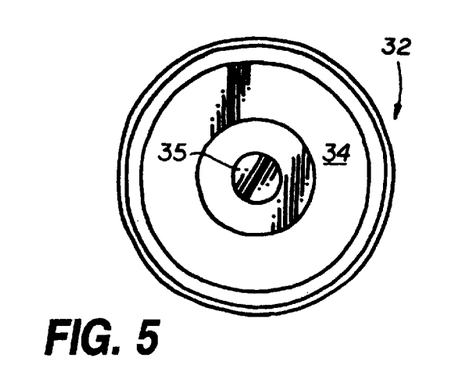
FIG. 5 is a top view illustrating the rotor or armature utilized in the subfractional induction motor of the invention.

The side view of lamina 11 in FIG. 4 shows the planar flat edge 31 of the lamination. The thickness T1 of lamina 10 equals the thickness T2 of lamina 11.

Figure 8:
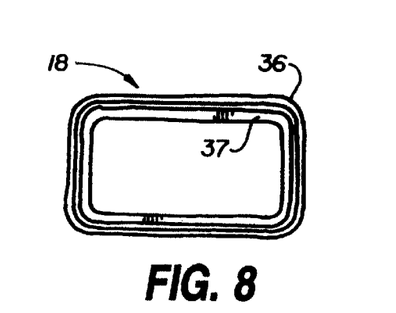
FIG. 8 is a side view illustrating a bobbin utilized on the inner portion of the stator of the motor of the invention to form the primary magnetic field in the motor.
Figure 9:
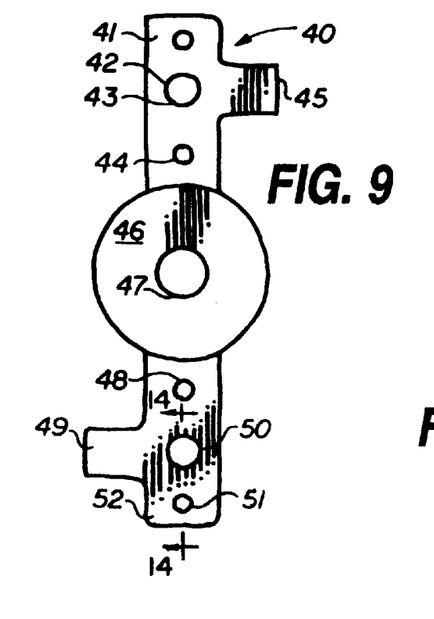
FIG. 9 is a top view illustrating a bracket utilized to mount the motor of FIGS. 1 to 8.

The inner portion of the stator of the motor is formed by stacking a plurality of laminae 11 in conventional fashion in registration one on top of the other such that aperture 27 in each lamina is aligned with the apertures 27 in the other stacked laminae and such that slots 24, 26 in each lamina are aligned with slots 24, 26, respectively, in the other stacked laminae. The number of laminae 11 utilized to make the inner portion of the stator equals the number of laminae 10 utilized to make the outer portion of the stator. After the inner laminae 11 are registered one on top of the other to form an inner laminate stack, a strip of copper 19 (FIG. 3) or other desired material is threaded up through slots 24, over the top of the inner laminate stack, down through aligned slots 23, and over the bottom of the inner laminate stack. Copper strip 19 forms a shaded pole. Another copper strip is similarly threaded through slots 25 and 26 to form a second shaded pole. One bobbin, indicated by dashed lines 18 in FIG. 3, is slid over the left hand end of the inner laminate stack of FIG. 3 to the position shown. Bobbin 18 bears against the flats formed by surfaces 18A and 18B. Another bobbin (not shown) is slid over the right hand end of the inner laminate stack of FIG. 3 and against the flats formed by surfaces 18C and 18D. Each bobbin 18 comprises a rectangular sleeve 37 wound with wire 36 (FIG. 8).

After bobbins and shaded poles have been installed on the inner laminate stack, the stack is positioned in open space 28 inside the outer laminate stack by simultaneously (1) sliding stack nubs 14 through the groove which is on the inside of the outer laminate stack and which is formed by stacked detents 12 and (2) sliding stacked nubs 15 through the groove which is on the inside of the outer laminate stack and which is formed by stacked detents 13. The inner laminate stack is so inserted in the outer laminate stack until the top and bottom surfaces of the inner and outer stacks are coplanar and until each lamina 10 is coplanar with one of the laminae 11 in the inner laminate stack. The coplanar position of each lamina 11 in the inner stack with one of the laminae 10 in the outer stack is illustrated by dashed lines 11A in FIG. 1.

Figure 7:
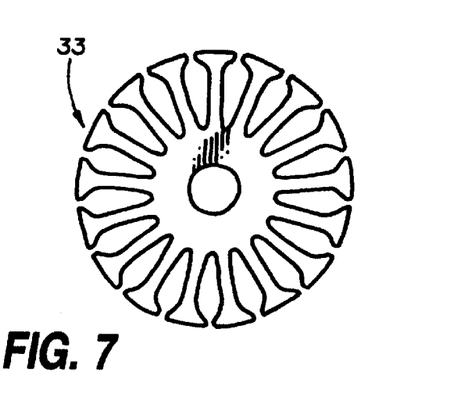
FIG. 7 is a top view illustrating a lamina utilized to construct the rotor of FIGS. 5 and 6.

After the inner and outer laminate stacks are pressed together in the manner described above, a rotor 32 is inserted in inside the inner laminate stack. The rotor 32 includes top surface 34 and shaft 35 having a longitudinal axis which is perpendicular to axes Y and Z and which is collinear with the center line of the cylindrical opening in the inner laminate stack which is formed by the registered openings 27 in the inner laminate stack. FIG. 7 illustrates a circular lamina 33 utilized in fabricating rotor or armature 32. When the diameter of lamina 10 is about 3.3 inches, the diameter of each lamina 33 is typically about one and a half inches. In the invention, the diameter of each lamina 33 has been reduced such that the ratio of the diameter of lamina 33 to the diameter or width of lamina 10 is in the range of 1:2.2 to 1:4.4. Reducing the size of the rotor enables the amount of metal in the stator to be increased so that the magnetic saturation point is not reached as quickly as when the stator has less mass. Further, reducing the diameter of the rotor facilitates using the rotor in a C-frame subfractional-horsepower shaded pole induction motor of comparable or smaller size to the concentric motor illustrated in FIGS. 1 to 8. By way of example, when the diameter of lamina 10 is 3.3 inches, the diameter of lamina 33 (and of rotor 32) is preferably in the range of 0.75 to 1.4 inches and is preferably, but not necessarily, less than the conventional diameter of one and a half inches.

Figure 6:
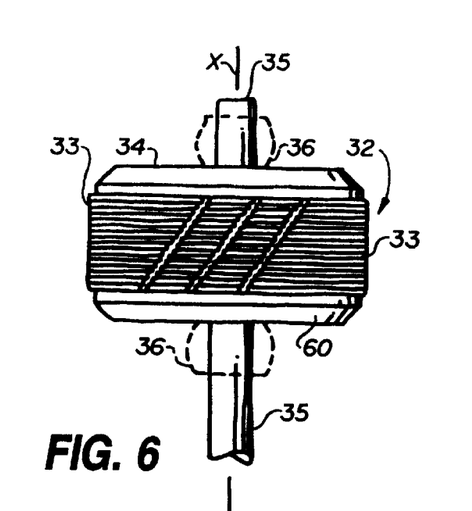
FIG. 6 is a side view illustrating the armature utilized in the subfractional induction motor of the invention.
Figure 10:
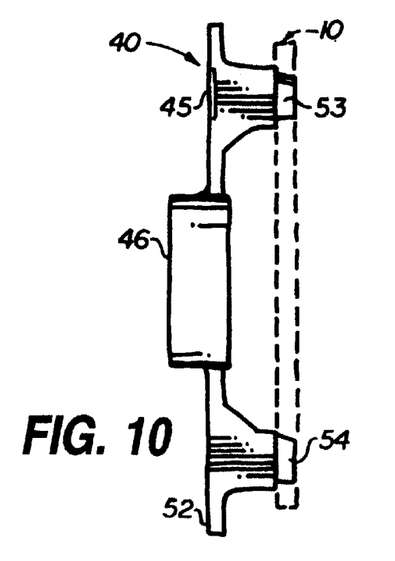
FIG. 10 is a side view illustrating the bracket of FIG. 9.
Figure 11:
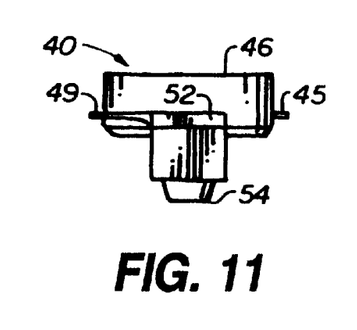
FIG. 11 is a front view illustrating the bracket of FIG. 9.

After the rotor 32 is placed inside the inner stator stack, self aligning porous metal bearings 36 are placed over shaft 35 on the top and bottom of rotor 32 (FIG. 6). A first mounting bracket 40 is then placed over the top surface 34 of rotor 32 such that feet 53 and 54 seat in apertures 38 and 39, respectively, of the lamina 10 on the top of the outer laminate stack (FIG. 10), such that shaft 35 extends upwardly through opening 47, such that bearing 36 on top of rotor 32 seats in semispherical surface 55 (FIGS. 12 and 13) of the bracket 40, and such that elongate cylindrical pin 70 extending outwardly from bracket 40 (FIGS. 12 and 13) extends into a slot 63 of bearing 36 to prevent the rotation of bearing 36. Shaft 35 also extends upwardly through cylindrical opening 64 in bearing 36. A second bracket 40 is then placed over the bottom surface 60 of rotor 32 such that feet 53 and 54 of the second bracket seat in apertures 38 and 39, respectively, of the lamina 10 on the bottom of the outer laminate stack, such that shaft 35 extends downwardly through opening 47 of the second bracket 40, and such that bearing 36 on the bottom of the rotor 32 seat in semispherical surface 55 of the second bracket 40. After the first and second mounting brackets are positioned as described, a first elongate bolt 61 is passed through apertures 43 and 38 and a nut is utilized to tighten the mounting brackets and laminae 10 together. A second elongate bolt 62 is passed through aperture 50 and 39 and a nut is utilized to tighten the mounting brackets and laminae 10 together. The first and second elongate bolts can also, in addition to passing through apertures 43,38 and 50,39, respectively, be long enough to pass through apertures in the housing of an evaporative cooler pump so that the assembled motor can be secured to the pump with nuts. Or, the motor can otherwise be secured to an evaporative cooler pump or to some other structure.

In FIGS. 9 to 13, mounting bracket 40 includes upper flat surface 41; apertures 42 to 44; circular flat surface 46; aperture 47; upper flat surface 52; apertures 48, 50, 51; tabs 45 and 49 to receive ground wire clips; feet 53 and 54; inner cylindrical surface 56 on the bottom of bracket 40; and, semispherical surface 55 on the bottom of bracket 40.

Figure 18:
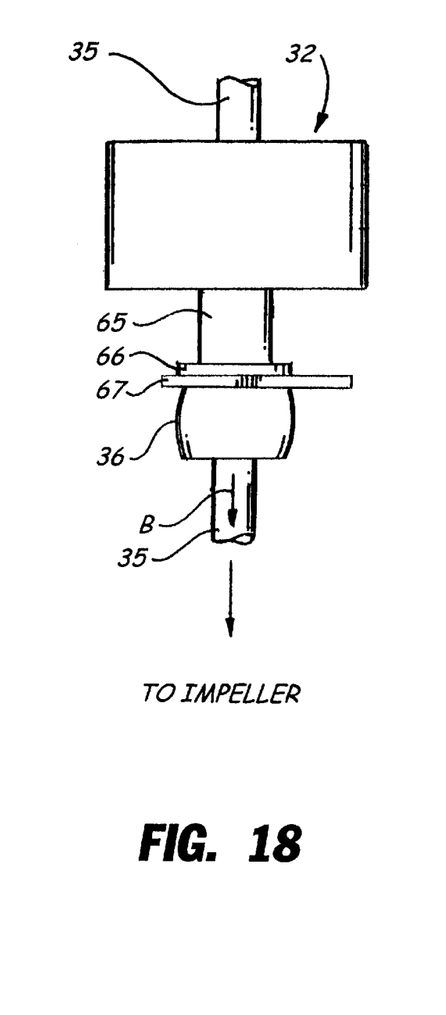
FIG. 18 is a side view of the washer—bearing system of FIG. 17 when assembled.

When the subfractional-horsepower induction motor of the invention is utilized to power a water pump in an evaporative cooler, an impeller is attached to the lower end of the shaft 35 of the motor. When the impeller turns in water in the pan of an evaporative cooler, the impeller often generates a downward force which pulls shaft 35 and rotor 32 downward in the direction of arrow B (FIG. 18). The downward force acting in the direction of arrow B forces the rotor 32 against spacer 65 and/or washer 66. Bearing 36 typically is fabricated from a porous metal which is impregnated with a lubricant. Spacer 65 and washer 66 are typically fabricated from plastic. Over time, the friction of the spacer 65 or washer 66 against the bearing 36 generates heat. When bearing 36 is metallic, the heat oxidizes and drives lubricant from the bearing 36. A metallic bearing 36 also abrades and wears spacer 35 or washer 66 to create wear debris. One method for ameliorating this problem is to interpose a brass thrust washer between the rotor 32 and the bearing 36. The brass washer is free to spin over the stationary bearing 36 while rotor 32 turns. A problem, however, associated with interposing the brass thrust washer is that if the downward force B generated by the impeller on shaft 32 is too high, then frictional forces generated between bearing 36 and the thrust washer produce a significant amount of heat and drive lubricant from the porous bearing 36.

Figure 12:
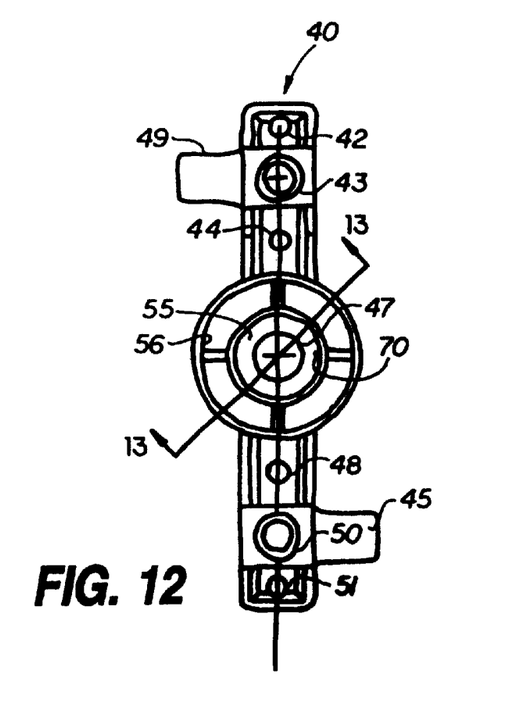
FIG. 12 is a bottom view further illustrating the bracket of FIG. 9.
Figure 13:
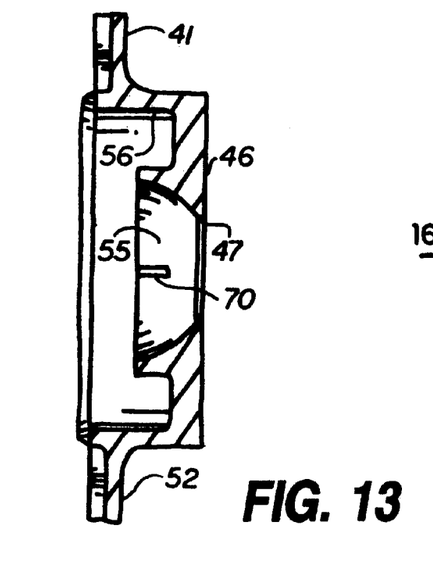
FIG. 13 is a section view further illustrating internal construction details of the bracket of FIG. 12 and taken along section line 13—13 thereof.
Figure 14:
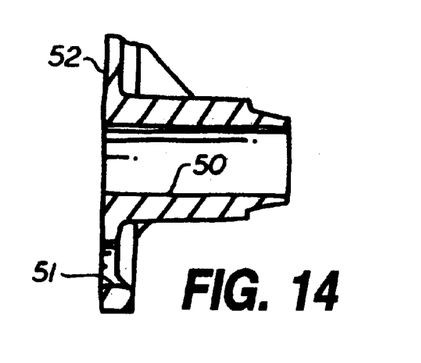
FIG. 14 is a section view further illustrating internal construction details of the bracket of FIG. 9 and taken along section line 14—14 thereof.
Figure 15:
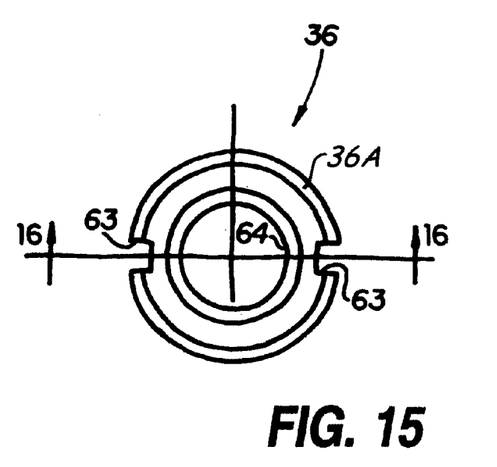
FIG. 15 is a top view illustrating the bearing utilize in the invention.
Figure 16:
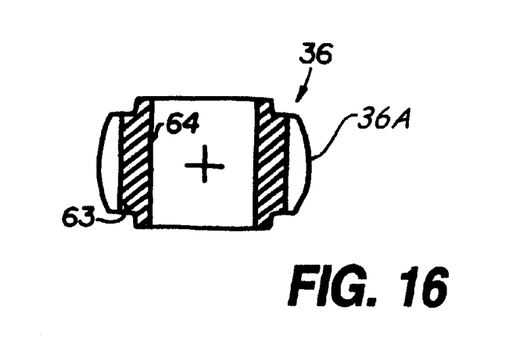
FIG. 16 is a side section view of the bearing of FIG. 15 taken along section line 16—16 and illustrating further construction details thereof.
Figure 17:
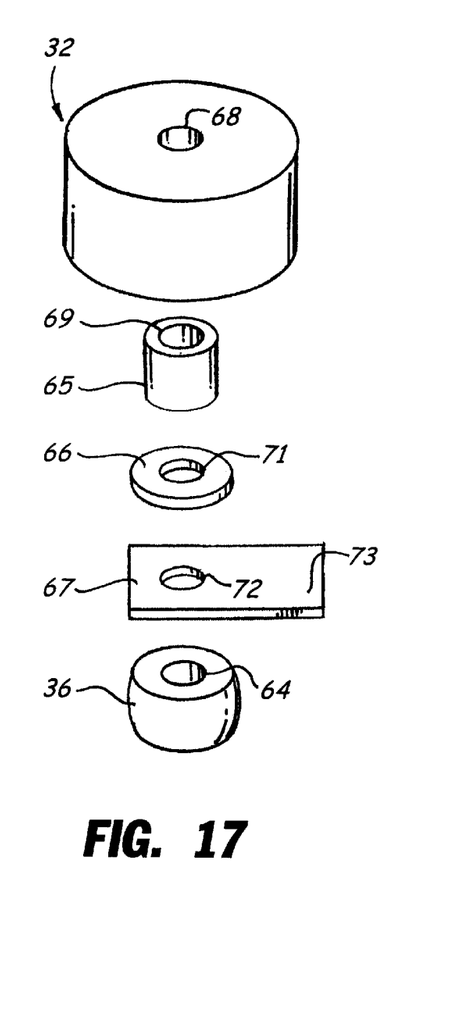
FIG. 17 is an exploded assembly view of a thrust washer—bearing system utilized in a motor constructed in accordance with the invention.

I have discovered an improved washer—bearing assembly which reduces the generation of heat and frictional forces and extends the life of the porous, lubricant impregnated, metal bearing 36. This washer—bearing assembly is illustrated in FIGS. 17 and 18 and includes plastic spacer 65, plastic thrust washer 66, leaf washer 67, and porous metal bearing 36. The rotor 32 in FIGS. 17 and 18 is, in conventional fashion, fixedly secured to and rotates simultaneously with shaft 35. The lower end of shaft 35 is attached to a pump impeller or some other load which produces force B acting along the longitudinal axis of shaft 35 and pulling shaft 35 and rotor 32 downwardly. Porous bearing 36 is mounted in a support assembly like mounting bracket 40 (FIGS. 12 and 13). Shaft 35 extends through cylindrical opening 69 in spacer 65, cylindrical opening 71 in space 66, cylindrical opening 72 in leaf washer 67, and opening 64 in bearing 36.

The inner diameter (ID) of opening 69 is presently preferably larger than the outer diameter (OD) of shaft 35 such that spacer 65 slides over shaft 35. The ID of opening 69 is presently about 0.007 thousandths (and preferably in the range of 0.001 to 0.010 thousandths) more than the OD of shaft 35. Frictional forces generated by rotating shaft 35 can cause spacer 65 to rotate in same direction of rotation as shaft 35. Similarly, the ID of opening 71 in FIG. 17 is presently preferably larger than the OD of shaft 35 such that washer 66 slides over shaft 35. The ID of opening 71 is presently about 0.007 thousandths (and preferably in the range of 0.001 to 0.010 thousandths) more than the OD of shaft 35. Frictional forces generated by rotating shaft 35 can cause washer 66 to rotate in the same direction of rotation as shaft 35.

The ID of opening 72 in stationary leaf washer 67 is presently preferably larger than the OD of shaft 35 such that the rotation of shaft 35 adjacent or near opening 72 produces minimal frictional forces acting on opening 72 to generate heat. The ID of opening 72 is presently about 0.005 thousandths (preferably 0.001 to 0.010 thousandths) more than the OD of shaft 35. End 73 or some other portion of leaf washer 67 is fixedly secured to mounting bracket 40 or some other structural member to prevent the rotation of washer 67. End 73 can also simply be positioned to bear against a structural component which interferes with and prevents movement of end 73 such that washer 67 can not rotate.

Since spacer 65 can rotate against washer 66 and washer 66 can rotate against washer 67, it is presently preferred that spacer 65, washer 66, and washer 67 be fabricated from plastic each having a relatively low coefficient of friction, typically in the range of 0.12 to 0.80. The presently preferred value of the coefficient of friction is in the range of 0.14 to 0.40. Further, it is preferred that washer 66 be fabricated from a plastic having a composition different from that of spacer 65 and washer 67. In addition, it is preferred that spacer 65 and washers 66, 67 be fabricated from plastics which is stable at elevated temperature in the range of about 150 degrees F to 300 degrees F. As used herein, a plastic is stable when it substantially retains its physical properties under a compressive load of 264 psi. A plastic substantially retains its physical properties if the property changes by less than ten percent under a compressive load of 264 psi.

The plastic utilized to fabricate spacer 65 and washers 66, 67 preferably is not impregnated with glass or other hard particles. Such particles can break free when the washers wear and can then function to abrade and accelerate the wear of the spacer 65, washers 66 and 67, shaft 35, and bearing 36. Wear debris such as hard glass particles are a major cause of the wear, and the resultant destruction, of a motor. A homogeneous, relatively soft plastic with good wear characteristics is preferred in spacer 65 and washers 66 and 67. For example, TEFLON KAPTON is a soft plastic, as is the NYLATRON polyamide—graphite plastic.

The stationary washer 67 performs the important function of sealing and protecting bearing 36 and preventing the wear of bearing 36. When bearing 36 wears, it typically generates small pieces of metal powder which were originally sintered to produce bearing 36. Such metal powder tends to rapidly abrade and destroy plastic pieces like spacer 65 and washers 66 and 67, producing plastic wear debris consisting of fine plastic particulate. The plastic particulate functions like a sponge and absorbs lubricant from the bearing, accelerating the failure of the bearing. The plastic wear debris can also work its way between the bearing and motor shaft, accelerating the wear of the bearing and the shaft. The plastic wear debris can further plug up openings in the porous metal bearing, preventing lubricant from flowing from the bearing into the space intermediate the bearing and the shaft. If the wear debris is metal, it can grind material from both the shaft and bearing, accelerating the failure of both.

In another embodiment of the invention illustrated in FIGS. 17 and 18, spacer 65 and washers 66 and 67 are fabricated from hard metals.

In a further embodiment of the invention illustrated in FIGS. 17 and 18, stationary washer 67 is utilized, but spacer 65 and/or washer 66 are omitted. Washer 67 is preferably, but not necessarily, fabricated from plastic.

In still another embodiment of the invention, washer 67, spacer 65, and washer 66 are combined into a single unitary component or spacer which does not rotate.

In yet a further embodiment of the invention, washer 67 and spacer 65 are combined into a non-rotating single unitary component and washer 66 is retained.

As would be appreciated by those of skill in the art, the washer—bearing system of the invention can be utilized in conjunction with any desired motor to help dissipate axial thrust force generated on a shaft 35 in the motor.

FIGS. 19 to 26 illustrate a bearing sleeve generally indicated by reference character 200. Although sleeve 200 is specially constructed for use in connection with mounting an evaporative cooler motor, it is understood that sleeve 200 can be used to house a bearing utilized in connection with a wide variety of motors or other mechanical devices requiring a bearing.

Figure 19:
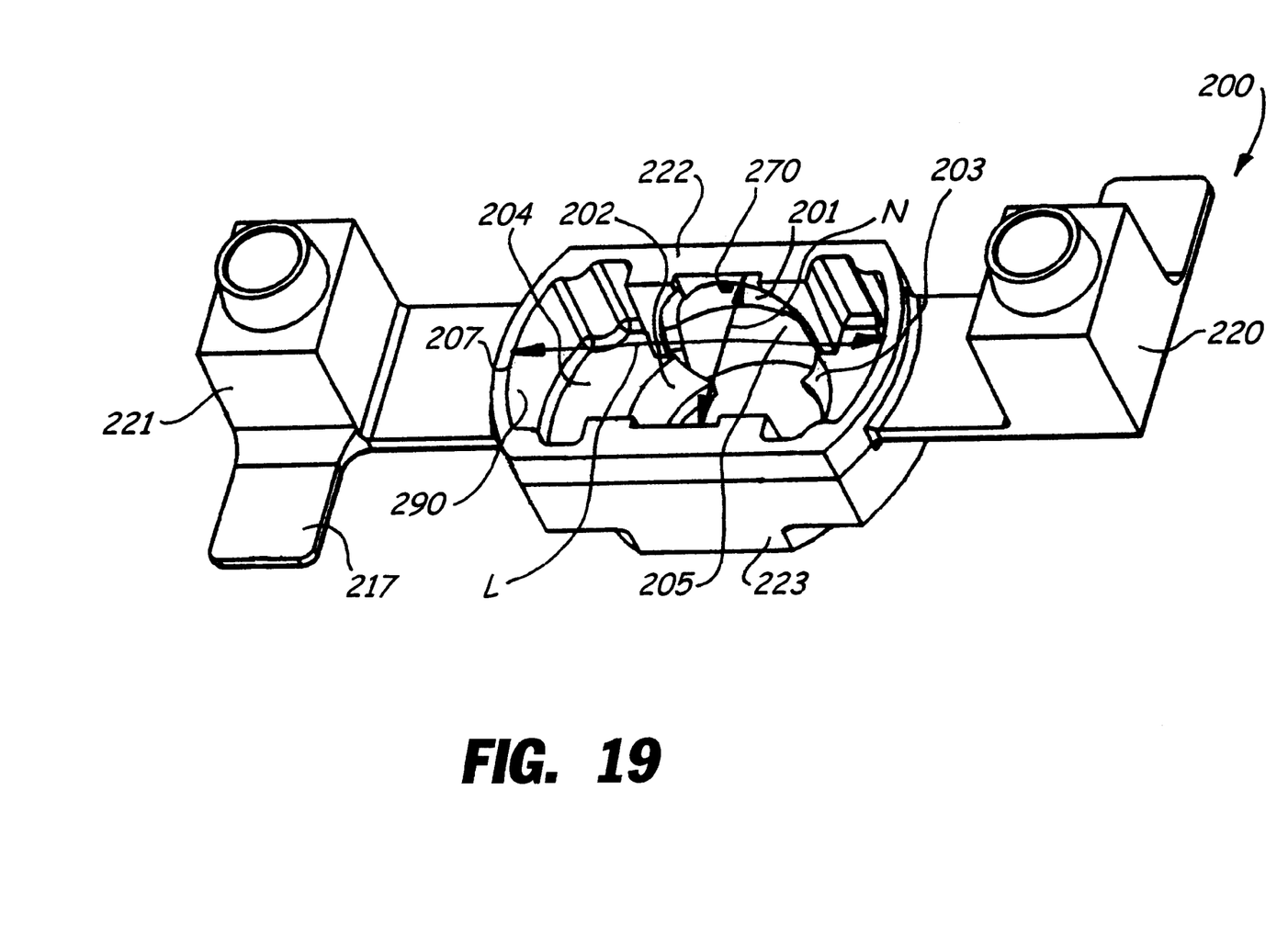
FIG. 19 is a perspective view illustrating a bracket constructed in accordance with another embodiment of the invention.
Figure 20:
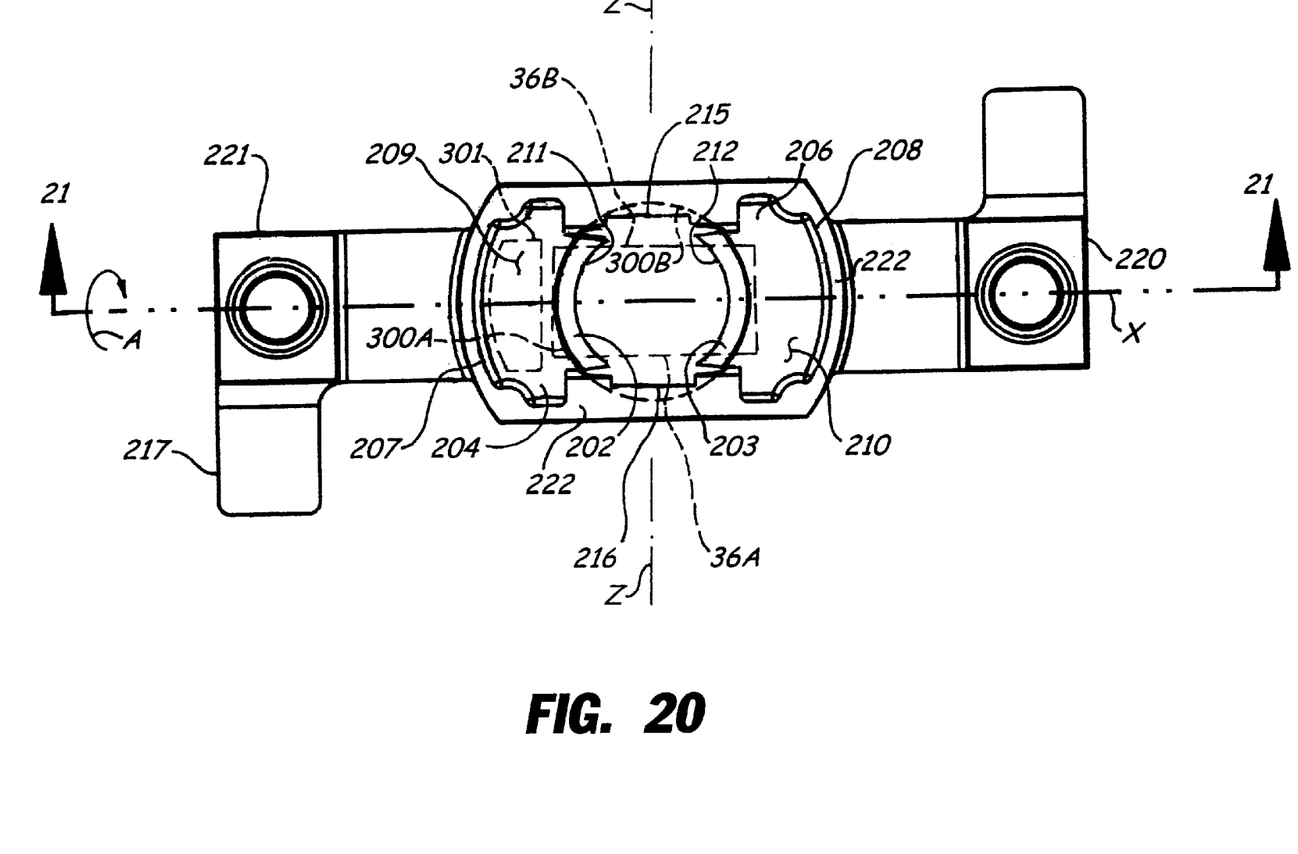
FIG. 20 is a top view further illustrating construction details of the bracket of FIG. 19.

Sleeve 200 includes a top 222 and a bottom 223. An opening formed in top 222 is bounded by sides 215 and 216, ends 207 and 208, and floor areas 204 and 206. The shortest distance W between sides 215 and 216 is the width of the opening. The shortest distance L between ends 207 and 208 is the length of the opening. A wick 301 saturated with lubricant can be inserted in space 209 against floor area 204. Wick 301 is wedged between a bearing 300 and the wall 290 extending from end 207 down to floor area 204. A similar wick (not shown) can be inserted in space 210 against floor area 206 and intermediate a bearing 300 and the wall extending from end 208 down to floor area 210.

If wicks are not utilized with bearing 300 and spaces 209 and 210 are therefore not required and are filled with solid metal, then ends 207 and 208 are closer together. The length L from end 207 to end 208 is still at least slightly greater than the outer diameter of bearing 300.

Sleeve 200 includes hollow members 220 and 221 and tab 217 depending from member 221.

Figure 21:
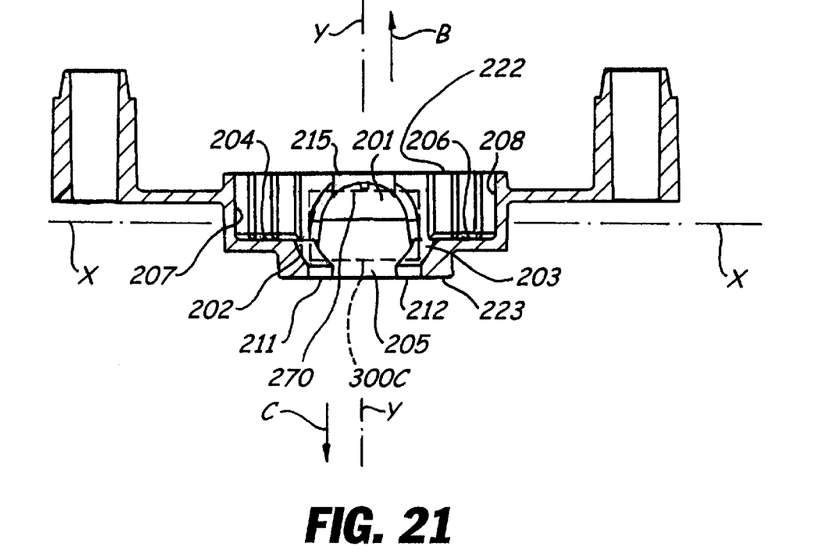
FIG. 21 is a side section view of the bracket of FIG. 20 taken along section line 21—21 thereof.
Figure 22:
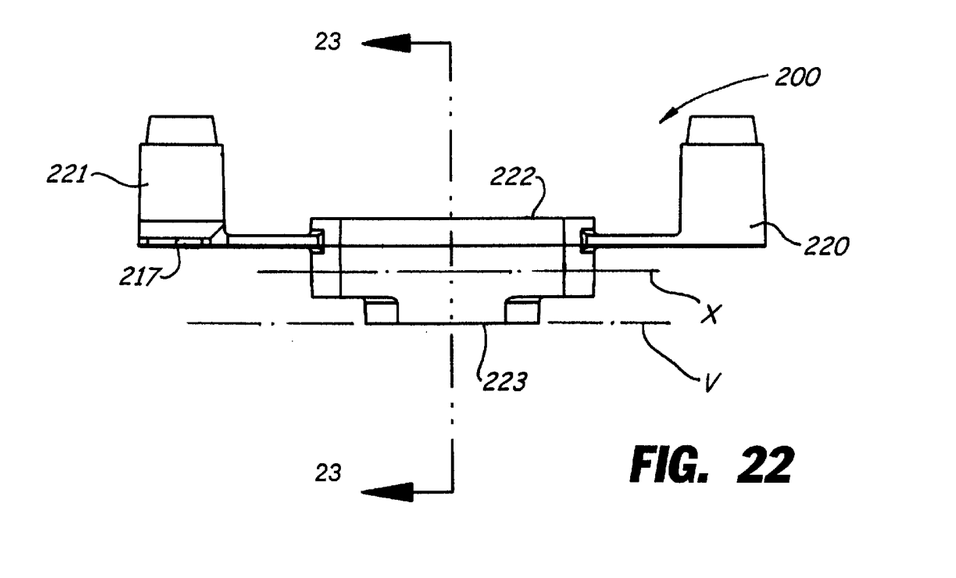
FIG. 22 is a side view of the bracket of FIG. 20.

Spaced apart opposing concave side walls 202 and 203 presently (although not necessarily) are of equivalent shape and dimension and each curve about at least a pair of axes, i.e. each wall 202, 203 has a curvature corresponding to a portion of the inside surface of a hollow sphere, or possibly of an ellipsoid or other geometric three dimensional shape with an arcuate surface and curved plane sections.

Figure 23:
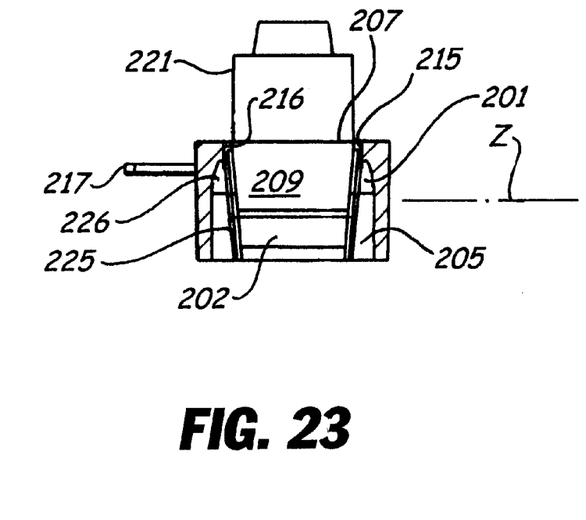
FIG. 23 end section view of the bracket of FIG. 22 taken along section line 23—23 thereof.
Figure 24:
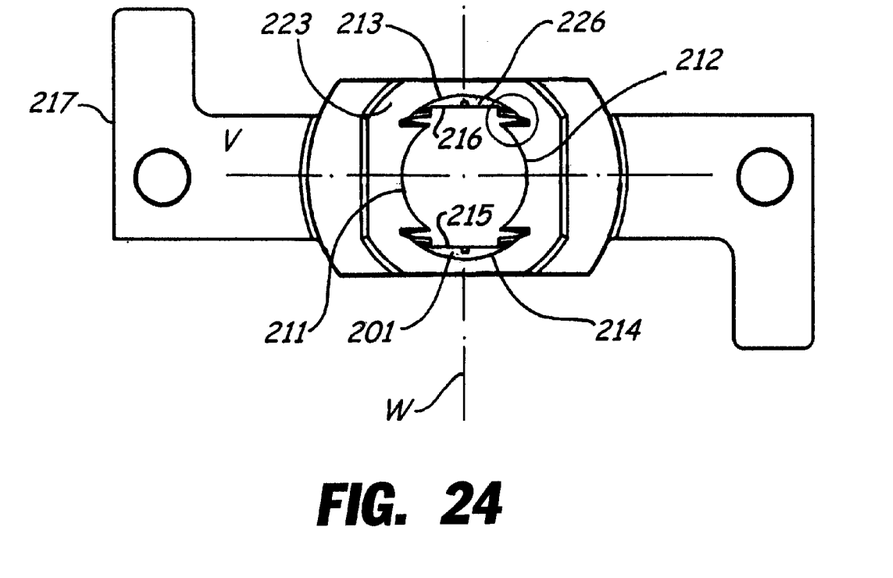
FIG. 24 is a bottom view of the bracket of FIG. 20.

Spaced apart opposing concave side walls 205 and 225 presently (although not necessarily) are of equivalent shape and dimension and each curve about a single axis, i.e., each wall 205 and 225 has a curvature corresponding to a portion of the inner surface of a hollow cylinder.

Spaced apart opposing concave side walls 201 and 226 presently (although not necessarily) are of equivalent shape and dimension and each curves about a pair of axes, i.e. each wall 201 and 226 each have a curvature corresponding to a portion of the inner surface of a hollow sphere, or possibly to the inner surface of a hollow ellipsoid or other geometric three dimensional shape with an arcuate surface and curved plane sections.

As will be described, side walls 202, 203, 201, and 226 act in concert to maintain a bearing 300 in place in sleeve 200 after the bearing has been inserted in sleeve 200 and rotated to its normal operative position. For purposes of this description, but not by way of limitation, it is assumed that bearing 300 is equivalent in shape and dimension to bearing 36, has a slot 63, and has opposing, spaced apart ends or flats 36A and 36B.

Outwardly projecting nib 270 fits into and engages a portion of slot 63 and prevents bearing 300 from rotating about axis Y after bearing 300 is inserted in bracket 200.

Opposing arcuate concave edges 211 and 212 are each symmetrically centered on axis V. Opposing arcuate concave edges 213 and 214 are each symmetrically centered on axis W. Axis V is normal to axis W, although the angle between axes V and W may vary as desired. Axis V is parallel to axis X. Although as can be seen in FIG. 21 surfaces 202 and 203 are spaced apart from and "beneath" (in FIG. 21) axis X, concave surfaces are, as can be seen in FIG. 20, symmetrically spaced with respect to axis X such that in FIG. 20 equal portions of each surface 202 and 203 extend to either side of axis X. Similarly, equal portions of each of concave surfaces 201 and 226 extend to either side of axis Z, even though each of surfaces 201 and 226 is, in FIG. 23, spaced "above" axis Z. Consequently, since axes X and Z are normal to one another, each concave surface 202, 203 is, generally speaking, normal to concave surfaces 201 and 226. The normal orientation of surface pair 202—203 with respect to surface pair 201—226 functions to hold bearing 300 in position in bracket 200.

When bearing 300 is inserted in bracket 200, bearing 300 is turned on edge in the orientation indicated by dashed lines 300A in FIG. 20. In this "on edge" orientation, the ends or flats 36A and 36B of bearing 300 are parallel to edges 215, 216 of the opening formed in the top 222 of bracket 200. Bearing 300 is then inserted through the opening in the top of bracket 200 until a portion of the outer cylindrical surface of bearing 300 contacts surfaces 202 and 203. At that point, bearing 300 is rotated in bracket 200 about axis X until bearing 300 is in the position indicated by dashed lines 300B in FIG. 20 and 300C in FIG. 21. The bearing in FIG. 21 as indicated by dashed lines 300B is in the same position and orientation as the bearing in FIG. 21 as indicated by dashed lines 300C. When bearing 300 is in the orientation indicated by dashed lines 300B and 300C, a portion of the bearing 300 extends under edge 215 and surface 222 and contacts concave surface 201 so that surface 201 functions to prevent the bearing from moving upwardly in the direction of arrow B. Similarly, a portion of the bearing 300 extends under edge 216 and surface 222 and contacts concave surface 226 such that surface 226 functions to prevent the bearing 300 from moving upwardly in the direction of arrow B. Finally, as can be seen in FIG. 21, portions of bearing 300 also rest against surfaces 202 and 203 such that surface 202 and 203 prevent movement of bearing 300 in the direction of arrow C.

If it is desired to remove bearing 300 from bracket 200 when the bearing 300 is in the orientation indicated by dashed lines 300C, the bearing 300 is rotated in bracket 200 about axis X in the direction indicated by arrow A to the orientation indicated by dashed lines 300A. Once the bearing is in the "on edge" orientation indicated by dashed lines 300A, the bearing can be lifted out of bracket 200 in the direction of arrow B.

One problem encountered in the practice of the invention is the manufacture of bracket 200. Since bracket 200 is presently preferably utilized in conjunction with bearings 36 having an outer cylindrical surface with a diameter of about 1.00 inch or less, utilizing an expanding mandrel machine tool ordinarily is not practical because the tool only produces a limited number of parts before failing. To overcome this problem, the molding system shown in the exploded assembly views of FIGS. 25 and 26 was developed and includes primary mold housing members 230 and 231, blocks 282 and 283, finger unit 235, finger unit 234, and pins 284 and 285.

Figure 25:
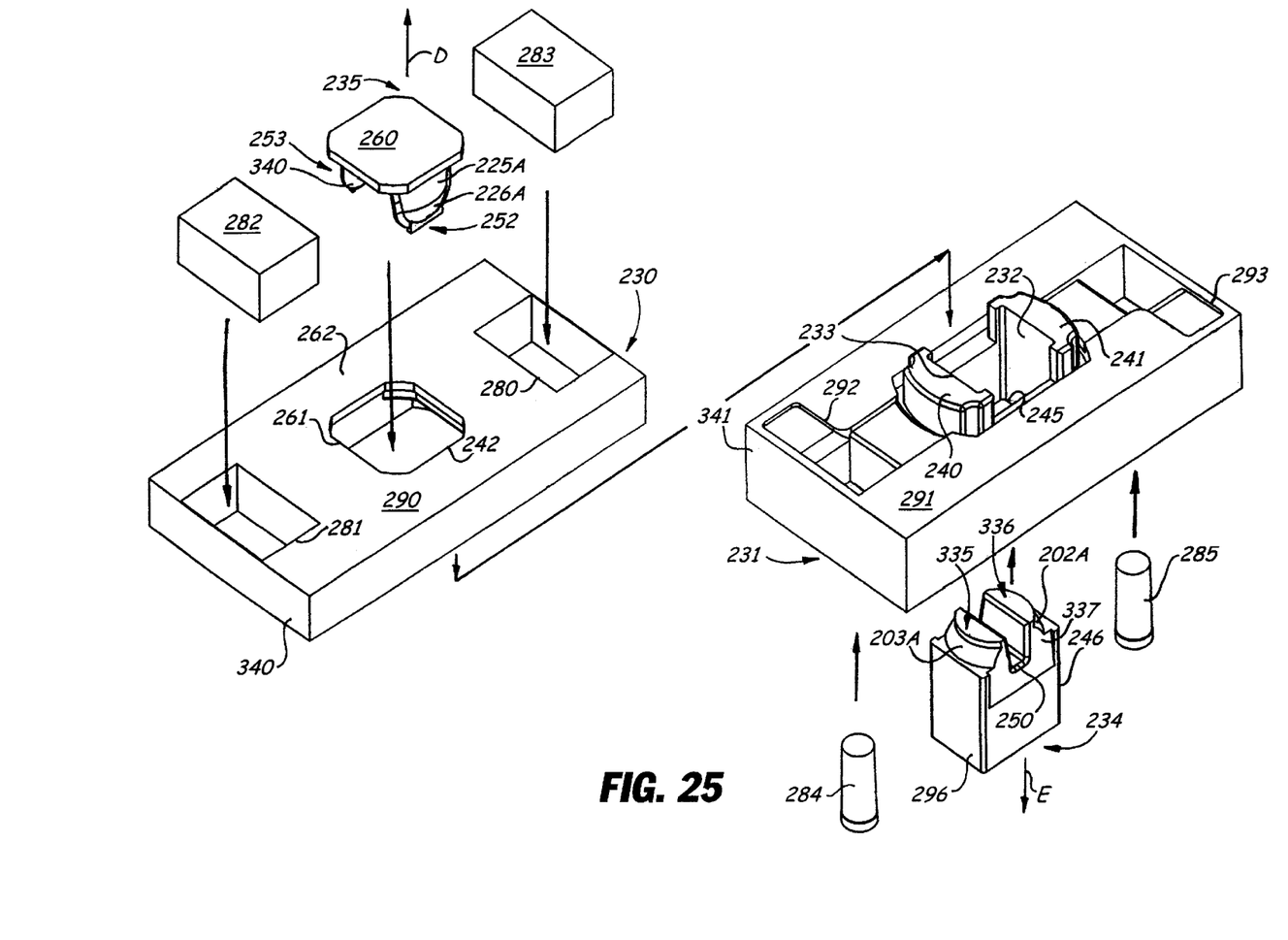
FIG. 25 is an exploded assembly view illustrating molding apparatus utilized to produce the bracket of FIGS. 19 to 24; and, FIG. 26 is an exploded assembly view illustrating inverted the molding apparatus of FIG. 25.
Figure 26:
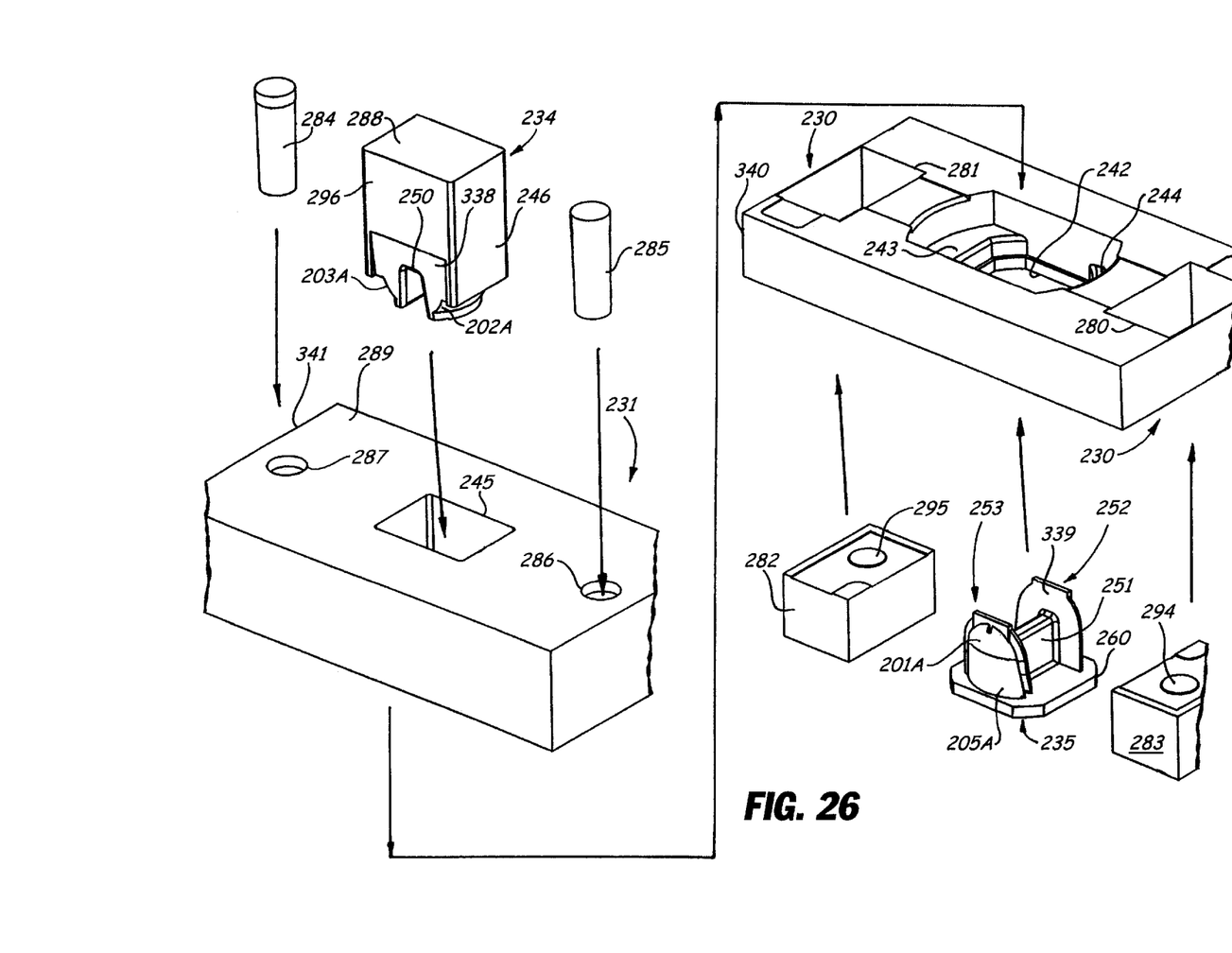

Finger unit 235 includes fingers 252 and 253. Finger 253 includes convex surfaces 201A and 205A. Surface 201A presently has a convex contour corresponding to a portion of the surface of a sphere. Surface 205A presently has a convex contour corresponding to a portion of the surface of a cylinder. Finger 252 includes convex surfaces 226A and 225A. Surface 226A presently has a convex contour corresponding to a portion of the surface of a sphere. Surface 225A presently has a convex contour corresponding to a portion of the surface of a cylinder.

Finger unit 234 includes fingers 335 and 336. Finger 335 includes convex surface 203A. Finger 336 includes convex surface 202A. Surfaces 202A and 203A presently correspond to a portion of the surface of a sphere.

Assembly of the mold is accomplished as follows. Members 230 and 231 are placed together such that flats 241 and 240 of member 231 contact and rest against flats 244 and 243, respectively, of member 230.

Block 282 is slidably inserted in opening 281. Portions of block 282 contact and rest on portions of surface 291 adjacent opening 292.

Block 283 is slidably inserted in opening 280. Portions of block 283 contact and rest on portions of surface 291 adjacent opening 293.

Pin 284 is slidably inserted through aperture 287 into aperture 294 in block 283.

Pin 285 is slidably inserted through aperture 286 into aperture 295 in block 282.

Finger unit 234 is slidably inserted in member 231 such that rectangular surfaces 235 and 296 slide along rectangular slot surface 233 and 232, respectively, formed in member 231. Unit 235 slides into member 231 until rectangular bottom surface 288 is flush with flat surface 289 of member 231.

Finger unit 235 is slidably inserted through aperture 242 in member 230 until tongue 251 of unit 235 seats in slot 250 of unit 234. After tongue 251 seats in slot 250, base 260 of unit 235 fits in opening 242 and is flush with surface 262 of member 230.

In addition, when tongue 251 seats in groove 250, inner surface 240 of finger 253 contacts and is seated against surface 338 of finger unit 234, and, inner surface 339 of finger 252 contacts and is seated against surface 337 of finger unit 234. Fingers 335 and 336 of unit 234 are, in effect, sandwich between fingers 252 and 253 of finger unit 235.

As would be appreciated by those of skill in the art, additional assembly structure typically is utilized to insure that the various mold components described above remain in position during the injection or insertion of liquid metal, metal powder, liquid plastic, or any other desired molding material into the mold assembly to form bracket 200. The use of metals, plastics, and other materials in a mold to produce a part is well known in the art and such techniques will not be discussed herein.

When material is inserted in the mold assembly of FIGS. 25 and 26, convex face 202A of unit 234 forms concave face 202 of bracket 200; convex face 203A of unit 234 forms concave face 203 of bracket 200; convex face 226A of unit 235 forms concave face 226 of bracket 200; and convex face 201A of unit 235 forms concave face 201 of bracket 200. Faces 226A and 201A are of equivalent shape and dimension. Faces 202A and 203A are of equivalent shape and dimension. Convex face 225A of unit 235 forms concave face 225 (FIG. 23) of bracket 200. Convex face 205A of unit 235 forms concave face 205 (FIGS. 21 and 23) of bracket 200.

After molding material is inserted in the mold assembly of FIGS. 25 and 26 and has sufficiently solidified to form a unitary bracket 200, finger unit 235 is withdrawn from the mold assembly in the direction of arrow D. Consequently, finger 252 is withdrawn through the opening formed in the bottom 223 of bracket 200 and moves immediately adjacent and past edge 213. Cylindrical surface 225A slides over concave edge 213. Finger 253 is also withdrawn through the opening formed in the bottom 223 of bracket 200 and moves immediately adjacent and past edge 214. Cylindrical surface 205A slides over concave edge 214. Finger unit 234 is withdrawn through opening 245 in the direction of arrow E in FIG. 25. Pins 284 and 285 are removed from member 231. Blocks 282 and 283 are removed from member 230. Members 230 and 231 are separated and the bracket 200 is removed.

Arcuate surface 36A of bearing 36 presently conforms to a portion of the surface of a sphere. Surface 36A (or portions of surface 36A) can, however, have an elliptical or some other arcuate shape which would, when bearing 36 is in the position illustrated by dashed lines 300C in FIG. 21, permit arcuate portions of surface 36A to contact slidably portions of arcuate surfaces 201, 226, 202, and 203. Only the portions of surface 36A which contact surface 201, 226, 202, and 203 need to have an arcuate shape. Accordingly, the shape and dimension of surface 36A can be altered as desired as long as surface 36A includes arcuate, preferably smooth, surface which slidably contact surfaces 202, 226, 202, and 203.

Having described my invention in such terms as to enable those skilled in the art to understand and practice it, and having described the presently preferred embodiments thereof, I claim:

1. A sleeve for an arcuate bearing which permits the bearing to be loaded into the sleeve and turned to a position in which the bearing is retained in the sleeve, the bearing having a height and an outer diameter greater than said height, said sleeve including
    (a) a top;
    (b) a bottom opposed to and spaced apart from said top:
    (c) an elongate opening formed in said top to receive said bearing, bounded by ends (207, 208) and sides (251, 216), and having a length and a width less than said length, said width being greater than said height of said bearing but less than said outer diameter of said bearing;
    (d) an opening formed in said bottom and bounded by
        (i) a first pair of spaced apart opposing edges, and
        (ii) a second pair of spaced apart opposing edges bounding and spaced further apart than said first pair of opposing edges;
    (e) a first pair of opposing spaced apart side walls (202, 203); and,
    (f) a second pair of opposing spaced part side walls (205, 225); a part of each of said first pair of opposing side walls (202, 203) having an arcuate shape.

2. A sleeve for an arcuate bearing which permits the bearing to be loaded into the sleeve and turned to a position in which the bearing is retained in the sleeve, the bearing having a height and an outer diameter greater than said height, said sleeve including
    (a) a top;
    (b) a bottom opposed to and spaced apart from said top:
    (c) an elongate opening formed in said top to receive said bearing bounded by ends (207, 208) and sides (251, 216), and having a length and a width less than said length, said width being greater than said height of said bearing but less than said outer diameter of said bearing;
    (d) an opening formed in said bottom and bounded by
        (i) a first pair of spaced apart opposing edges, and
        (ii) a second pair of spaced apart opposing edges bounding and spaced further apart than said first pair of opposing edges;
    (e) a first pair of opposing spaced apart side walls (202, 203); and,
    (f) a second pair of opposing spaced part side walls (205, 225); a part of each of said second pair of opposing side walls (205, 225) having an arcuate shape.

3. A sleeve for an arcuate bearing which permits the bearing to be loaded into the sleeve and turned to a position in which the bearing is retained in the sleeve, the bearing having a height and an outer diameter greater than said height, said sleeve including
    (a) a top;
    (b) a bottom opposed to and spaced apart from said top:
    (c) an elongate opening formed in said top to receive said bearing, bounded by ends (207, 208) and sides (251, 216), and having a length and a width less than said length, said width being greater than said height of said bearing but less than said outer diameter of said bearing;
    (d) an opening formed in said bottom and bounded by
        (i) a first pair of spaced apart opposing edges, and
        (ii) a second pair of spaced apart opposing edges bounding and spaced further apart than said first pair of opposing edges;
    (e) a first pair of opposing spaced apart side walls (202, 203); and,
    (f) a second pair of opposing spaced part side walls (205, 225); said opening being shaped and dimensioned to receive at least one wick adjacent, contacting, and lubricating the bearing.

* * * * *